(12) United States Patent
Rice

(10) Patent No.: US 10,920,811 B2
(45) Date of Patent: Feb. 16, 2021

(54) COMPONENT ASSEMBLY FOR HIGH-PRECISION JOINING OF COMPONENTS

(71) Applicant: Raytheon Company, Waltham, MA (US)

(72) Inventor: Philip S. Rice, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 421 days.

(21) Appl. No.: 15/898,163

(22) Filed: Feb. 15, 2018

(65) Prior Publication Data

US 2019/0249966 A1 Aug. 15, 2019

(51) Int. Cl.
*F16B 7/18* (2006.01)
*F42B 15/36* (2006.01)

(52) U.S. Cl.
CPC .............. *F16B 7/182* (2013.01); *F42B 15/36* (2013.01); *Y10T 403/556* (2015.01)

(58) Field of Classification Search
CPC ......... F16B 7/182; F16B 7/185; F16L 15/008; F16L 21/022; F16L 25/025; F42B 15/36; Y10T 403/556; Y10T 403/56
USPC .................................................. 403/296, 299
See application file for complete search history.

(56) References Cited

U.S. PATENT DOCUMENTS

| | | | |
|---|---|---|---|
| 2,259,232 A * | 10/1941 | Stone ................... | E21B 17/1085 175/325.5 |
| 2,979,285 A | 4/1961 | Planitzer | |
| 3,574,373 A * | 4/1971 | Le Derf .................. | F16B 7/182 403/296 |
| 3,652,034 A | 3/1972 | Schindler et al. | |
| 3,702,707 A | 11/1972 | Rosan, Sr. | |
| 4,878,285 A * | 11/1989 | Carstensen ........... | E21B 17/042 29/451 |
| 5,277,460 A | 1/1994 | Grainge | |
| 5,474,334 A * | 12/1995 | Eppink .................... | E21B 7/067 175/74 |
| 6,098,928 A | 8/2000 | Bross et al. | |
| 6,371,684 B2 | 4/2002 | Giesenberg et al. | |
| 7,699,354 B2 * | 4/2010 | Beard .................... | F16L 37/138 285/108 |
| 8,408,136 B1 | 4/2013 | Lee | |
| 8,894,011 B1 | 11/2014 | Guerquin | |
| 8,998,270 B2 | 4/2015 | Wolff | |
| 9,145,745 B2 * | 9/2015 | Pallini, Jr. ............. | E21B 17/085 |

(Continued)

*Primary Examiner* — Josh Skroupa

(57) ABSTRACT

A component assembly comprises a first housing and a second housing jointed by a coupling assembly. The coupling assembly comprises a coupling body and a floating torque ring axially slidably interfaced to the coupling body. The coupling body comprises a first threaded portion engaged with a first threaded coupling section of the first housing, and a second threaded portion engaged with a second threaded coupling section of the second housing. The floating torque ring is radially fixed to the coupling body, and is axially movable relative to the coupling body. Rotation of the floating torque ring causes relative rotation of the coupling body, thereby threadably joining the first housing and the second housing about the coupling body independent of axial positions of the housings due to the axially movable floating torque ring. A method of joining the housings is provided.

20 Claims, 4 Drawing Sheets

(56) References Cited

U.S. PATENT DOCUMENTS 10,082,042 B2 * 9/2018 Scott .......................... F02K 1/80
2015/0211832 A1 7/2015 Travis

* cited by examiner

COMPONENT ASSEMBLY FOR HIGH-PRECISION JOINING OF COMPONENTS

BACKGROUND

Certain high-performance devices, such as missiles and underwater vehicles, typically have cylindrically-shaped body sections or housings that require precision coupling at the interfaces at which the body sections or housings are joined together. This is generally because the body sections or housings need to be sealed at the joints, such as for environmental sealing (e.g., from water, dust) and electromagnetic sealing (i.e., to protect on-board electrical components from damage). Precision coupling between such body sections or housings can also be important for proper section alignment between the body sections or housings to ensure normal operation of the high-performance device (e.g., to ensure the body sections or housings do not break-up during jettison or flight, for instance).

Existing body sections or housings are typically joined by fastening devices, such as radial screws or bolts that are disposed through both body sections or housings radially, thereby at least partially extending into an inner chamber area defined by the body sections or housings. Such fasteners can encroach into the inner chamber area, thereby reducing the available space for other components therein, such as on-board electronics, propulsion systems, etc. Therefore, the body sections or housings may be required to have a slightly larger diameter than necessary or desired to accommodate for such radial fasteners. And, such radial fasteners are typically prone to cause slippage of the body sections or housings relative to each other due to tolerance issues and the fact that radial fasteners can permit such slippage. This can be detrimental to the proper operation of the device or vehicle. Radial fasteners also suffer from "double fixed fastener" problems when using flat head screws.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1A:
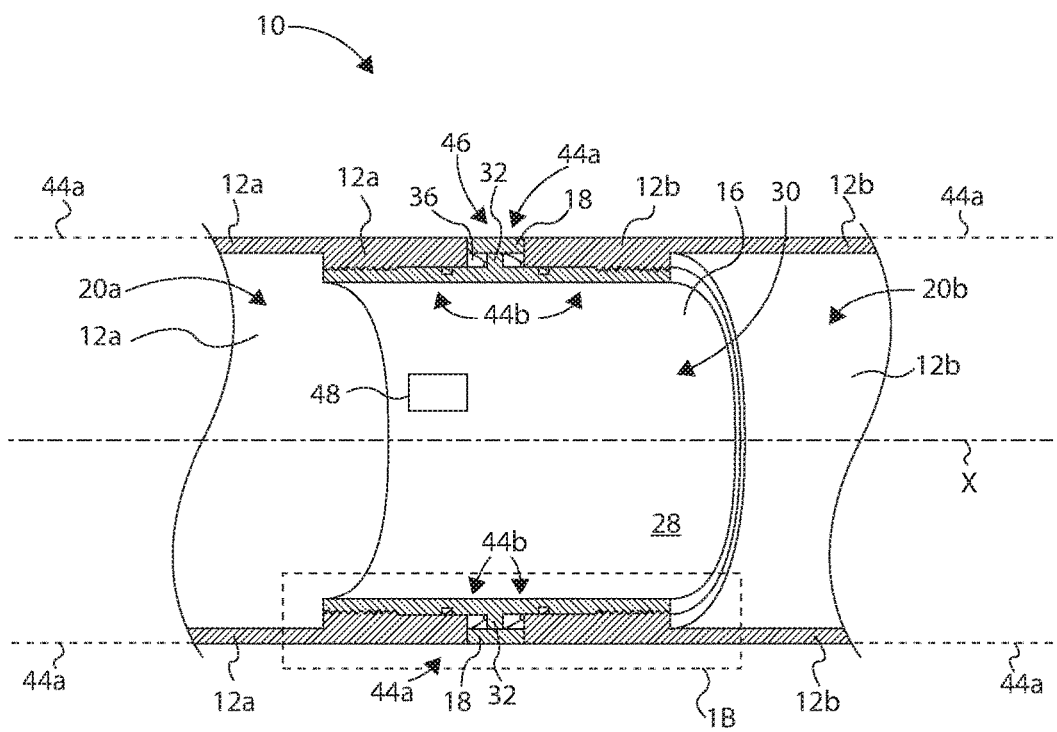
FIG. 1A is a partial isometric, cross-sectional view of a component assembly in a joined configuration, taken generally about lines 1A-1A of FIG. 2 (FIG. 2 being an exploded view of the component assembly) in accordance with an example of the present disclosure.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

The present disclosure sets forth a component assembly comprising a first body section or housing comprising a first threaded coupling section, and a second body section or housing comprising a second threaded coupling section. The component assembly further comprises a coupling assembly joining the first housing to the second housing. The coupling assembly can comprise a coupling body and a floating torque ring. The coupling body can comprise a first threaded portion engaged with the first threaded coupling section, and a second threaded portion engaged with the second threaded coupling section. The floating torque ring can be axially slidably interfaced to the coupling body. Thus, rotation of the floating torque ring (via a tool) causes rotation of the coupling body, thereby joining the first housing and the second housing about the coupling body independent of an axial position of the first housing relative to an axial position of the second housing.

In one example, the coupling body can comprise a plurality of perimeter protrusions, and the floating torque ring can comprise a plurality of inner recesses axially slidably interfaced to respective perimeter protrusions, such that the floating torque ring is axially movable relative to the coupling body and is radially fixed to the coupling body when joining the first and second housings.

In one example, the component assembly is devoid of fasteners protruding inwardly into an inner chamber area defined by the coupling body.

The present disclosure further sets forth a method of coupling housings with a coupling assembly. The method can comprise obtaining a first housing having a first threaded coupling section, and a second housing having a second threaded coupling section. The method can comprise engaging the first threaded coupling section to a first threaded portion of a coupling body, and engaging the second threaded coupling section to a second threaded portion of the coupling body. The method can comprise rotating a floating torque ring to rotate the coupling body, thereby joining the first housing and the second housing about the coupling body independent of an axial position of the first housing relative to an axial position of the second housing.

To further describe the present technology, examples are now provided with reference to the figures.

FIGS. 1A-3B illustrate a component assembly 10 in accordance with an example of the present disclosure. The component assembly 10 can facilitate the joining or coupling of two tube or tube-like structural sections, such as two body components or housings that form part of a vehicle. In one example, the two body sections can form a portion of a missile, such as shown in FIG. 4, or an underwater vehicle or other generally cylindrically-shaped body, mechanism, vehicle, etc. It is noted that the examples discussed herein and shown in the drawings are not intended to be limiting in any way. For example, the technology discussed herein is not intended to be limited to high velocity devices or vehicles, such as missiles, or underwater vehicles. Indeed, it is contemplated that the component assembly disclosed herein can be applicable to and implemented for use with and to form a variety of different devices or structures where two cylindrical structural components or members are desired to be joined or coupled together to make up the device or structure.

Figure 1B:
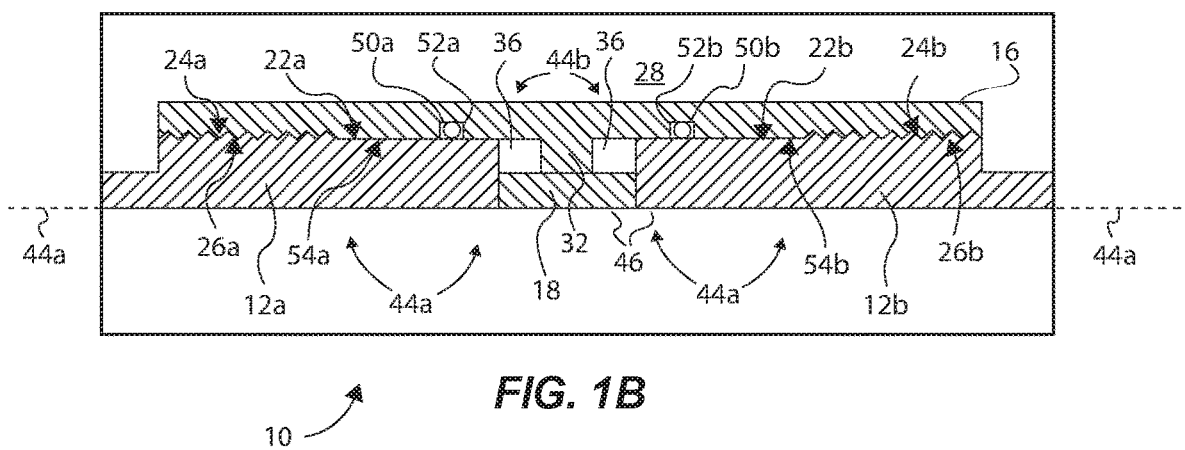
FIG. 1B is a close-up front view of the component assembly of FIG. 1A, taken about cut-out 1B of FIG. 1A.

FIGS. 1A and 1B show the component assembly 10 in a joined configuration, meaning that the component assembly 10 is fully assembled and joined, as will be appreciated from the following discussion and the drawings. In this example, the component assembly 10 can comprise a first housing 12a and a second housing 12b joined together by a coupling assembly 14. The coupling assembly 14 can comprise a coupling body 16 and a floating torque ring 18. As an overview, upon rotating the floating torque ring 18, the coupling body 16 is concurrently rotated, which thereby (threadably) draws the first housing 12a and the second housing 12a toward each other along an axial direction until being fully moved to the joined configuration, as in FIGS. 1A and 1B. Notably, the floating torque ring 18 is axially slidably engaged to the coupling body 16 to accommodate joining the first and second housings 12a and 12b about the coupling body 16, independent of the axial positions of the first and second housings 12a and 12b relative to each other. This provides relatively highly precise axial alignment of the housings 12a and 12b when joined together, as compared to prior joining techniques, as further detailed below.

More specifically, the first housing 12a can comprise a generally cylindrically-shaped body being hollow and defining an inner opening area 20a. The first housing 12a can comprise an inner mating section 22a being generally smooth or curvilinear, and formed about an inner surface of the first housing 12a proximate an end (the end to be joined) of the first housing 12a. The first housing 12a can further comprise a threaded coupling section 24a formed adjacent the inner mating section 22a. The inner mating section 22a and the threaded coupling section 24a can comprise a raised portion of the first housing 12a that extends inward toward a center of the first housing 12a (i.e., these can define a thicker wall portion than the rest of the first housing 12a, with the inner wall of the first housing 12a stepping up to the inner mating section 22a and the threaded coupling section 24a, as shown). The threaded coupling section 24a can comprise a section of threads (e.g., left-handed threads) formed about an inner surface area of the first housing 12a. The section of threads can comprise any number and configuration of threads as needed.

Similarly, the second housing 12b can comprise a generally cylindrically-shaped body being hollow and defining an inner opening area 20b. The second housing 12b can comprise an inner mating section 22b being generally smooth or curvilinear, and formed about an inner surface of the second housing 12b proximate an end (the end to be joined) of the second housing 12b. The second housing 12b can further comprise a threaded coupling section 24b formed adjacent the inner mating section 22b. The inner mating section 22b and the threaded coupling section 24b can comprise a raised portion of the first housing 12b that extends inward toward a center of the first housing 12b (i.e., these can define a thicker wall portion than the rest of the first housing 12b, with the inner wall of the first housing 12b stepping up to the inner mating section 22b and the threaded coupling section 24b, as shown). The threaded coupling section 24b can comprise a section of threads (e.g., right-handed threads) formed about an inner surface area of the second housing 12b, again, the section of threads comprising any number and configuration of threads as needed.

The coupling body 16 (of the coupling assembly 14) can comprise a first threaded portion 26a formed about an outer surface of the coupling body 16 proximate or about a first end of the coupling body 16. The first threaded portion 26a can comprise a section of threads formed in a left-handed manner and that correspond to and mate with the left-handed threads of the coupling section 24a of the first housing 12a. The coupling body 16 can comprise a second threaded portion 26b formed about the outer surface of the coupling body 16 proximate or about a second end of the coupling body 16. The second threaded portion 26b can comprise a section of threads formed in a right-handed manner and that correspond to and mate with the right-handed threads of the coupling section 24b of the second housing 12b.

The coupling body 16 can be generally formed as a cylindrically-shaped hollow body having an inner radial surface 28 that defines an inner chamber area 30. Notably, the inner radial surface 28 can be generally smooth along its entire surface area (i.e., from one end to the other end of the coupling body 16). As further discussed below, the component assembly 14 can be formed such that the inner chamber area 30 of the component assembly 10 is devoid of fasteners or other coupling components that would protrude or extend inwardly to the inner chamber area 30 through the inner radial surface 28. Advantageously, this maximizes the available space about or within the inner chamber area 30 for other components, such as electronic assemblies, propulsion components, cargo, payloads, etc.

The coupling body 16 can comprise a plurality of perimeter lugs or protrusions 32 (the coupling body 16 can comprise any number of perimeter protrusions or lugs) spaced apart and formed radially around a perimeter surface 34 of the coupling body 16. The perimeter protrusions 32 can be raised portions spaced evenly apart around the perimeter surface 34. In one example, the floating torque ring 18 can be an annular ring or annular body that has an inner diameter slightly greater than an outer diameter of the coupling body 16 proximate the perimeter surface 34, so that the floating torque ring 18 can be slidably interfaced over the coupling body 16. Accordingly, the floating torque ring 18 can comprise a plurality of inner recesses 36 formed radially around an inner surface 37 of the floating torque ring 18. The inner recesses 36 can be slots (or other reduced cross-sectional area features) formed axially through respective portions of the floating torque ring 18. Thus, the inner recesses 36 can be formed at locations that correspond to locations of the perimeter protrusions 32 of the coupling body 16, so that the inner recesses 36 can be axially slidably interfaced to respective perimeter protrusions 32. In this manner, the floating torque ring 18 is axially slidably interfaced to the coupling body 16 about such interfaces between the inner recesses 36 and respective perimeter protrusions 32; however, the floating torque ring 18 is radially fixed or locked (or restricted from rotation) relative to the coupling body 16 due to such interfaces allowing axial movement, but restricting rotational movement, of the floating torque ring 18 relative to the coupling body 16. This is what is meant by "floating" torque ring, meaning that the torque ring 18 can somewhat "float" or freely move axially along a longitudinal axis X of the component assembly 10, because of the interface and configuration of the perimeter protrusions 32 and the corresponding inner recesses 36 of the torque ring 18 (but with some axial movement limitations upon contacting one or both of the housings 12a and 12b, as discussed below).

Figure 2:
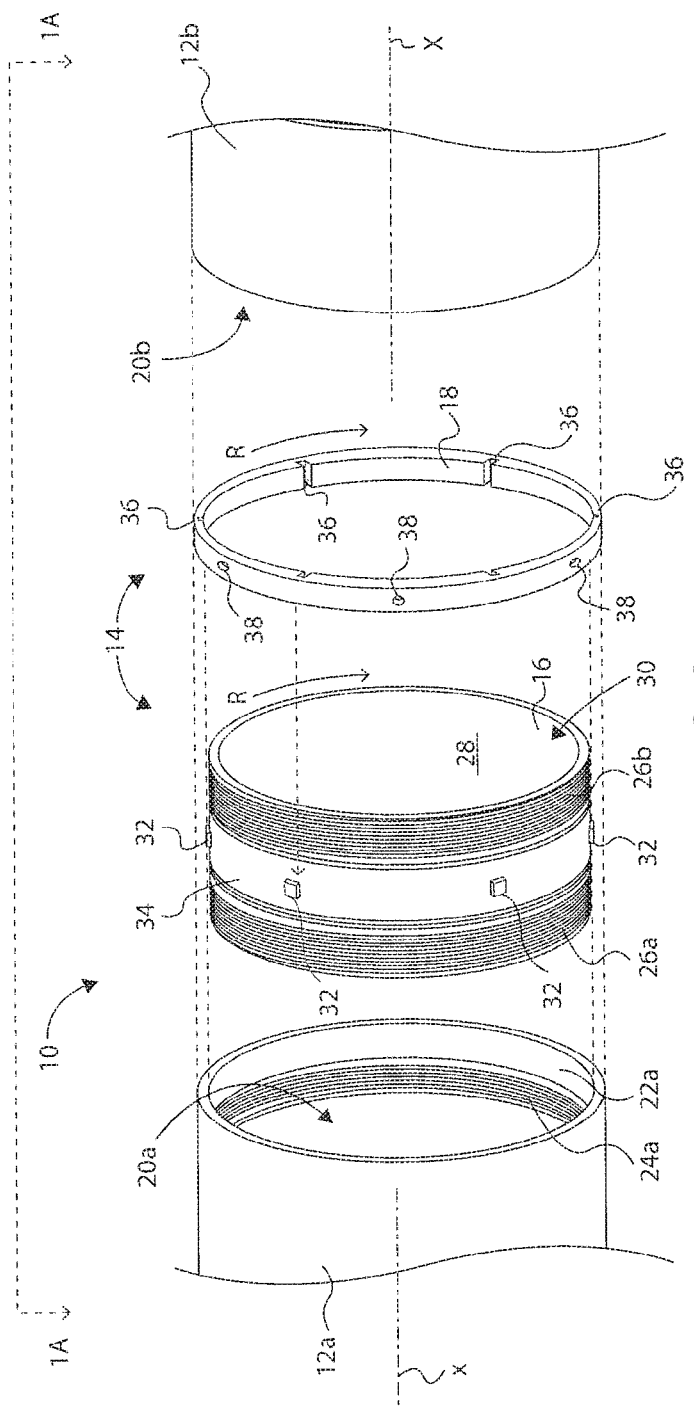
FIG. 2 is a partial isometric, exploded view of the component assembly of FIG. 1A.
Figure 3A:
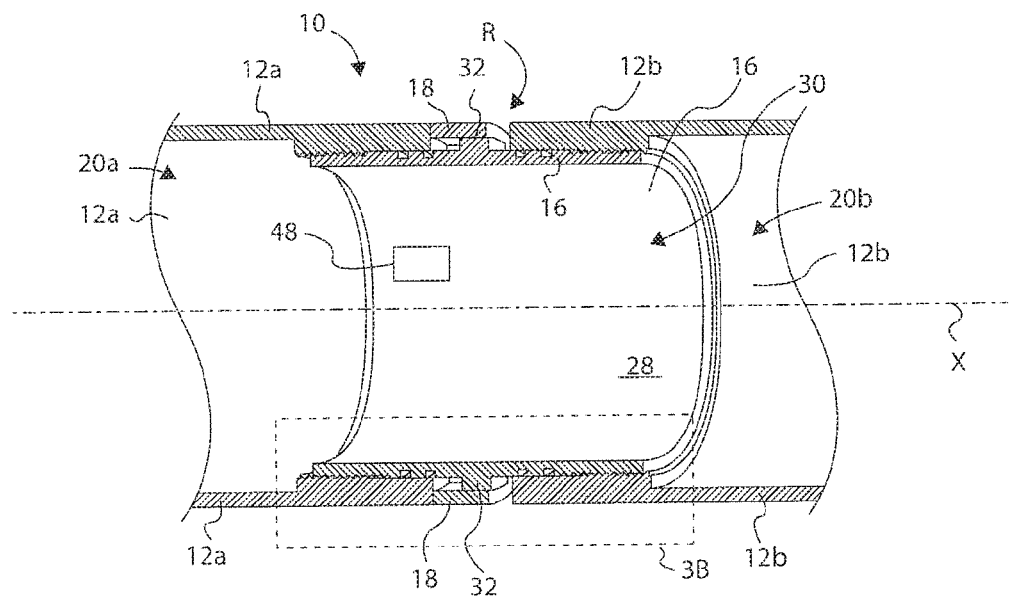
FIG. 3A is a partial isometric, cross-sectional view of the component assembly of FIG. 1A in an un-joined configuration.
Figure 3B:
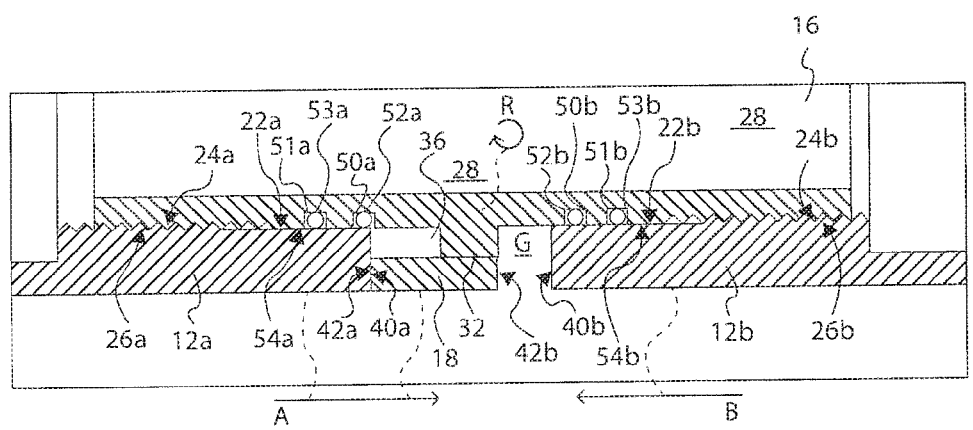
FIG. 3B is a close-up front view of the component assembly of FIG. 1A, taken about cut-out 3B of FIG. 3A.
Figure 4:
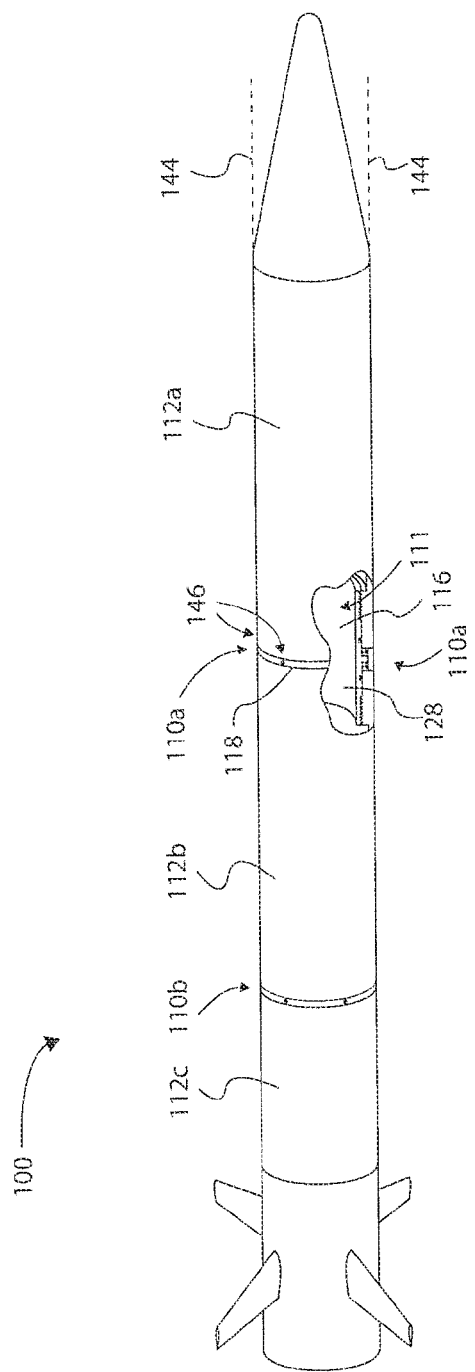
FIG. 4 is an isometric view of an example device or vehicle in the form of a missile, the missile having multiple body sections coupled together via two of the component assemblies of FIG. 1A, and having a cut-out to shown the inner area proximate one of the component assemblies.

The floating torque ring 18 can comprise one or more tool interface features 38 that function to engage with a tool (e.g., a spanner wrench) for rotating the floating torque ring 18 (see arrows R in FIGS. 2-3B). Such rotation of the floating torque ring 18a causes concurrent rotation of the coupling body 16, wherein upon such rotation, the first and second housings 12a and 12b are caused to be brought and joined together about the coupling assembly 14. Note that the term "ring" is not meant to be limited to any size or shape, and that the floating torque ring 18 can have a thicker or wider body than shown, and can still have the claimed inner recesses and that can still operate as described with reference to the floating torque ring 18 of the drawings.

In an alternative example, the perimeter protrusions 32 of the coupling body 16 can instead comprise an annular flange or protrusion that has one or more recessed features, while the recessed portions 36 of the floating torque ring 18 can instead comprise protrusions that are received in said recessed features of the coupling body.

With continued reference to FIGS. 1-2, FIGS. 3A and 3B further illustrate the first and second housings 12a and 12b being partially joined, or in an un-joined configuration, to illustrate the functionality of the floating torque ring 18 and the coupling body 16 accommodating or facilitating joining the first and second housings 12a and 12b. Specifically, the floating torque ring 18 can be positioned over or around the coupling body 16, such that respective inner recesses 36 are aligned and interfaced with respective perimeter protrusions 32. In this manner, the floating torque ring 18 can be situated between the first and second threaded portions 26a and 26b of the coupling body 16. Once situated, the first housing 12a can be situated over the coupling body 16, such that the inner mating section 22a surrounds and slides over the first threaded portion 26a of the coupling body 16 until the threads of the first threaded coupling section 24a are aligned with the threads of the first threaded portion 26a of the coupling body 16. In this manner, the inner mating section 22a can be recessed outwardly relative to the first threaded coupling section 24a to provide sufficient clearance for the inner mating section 22a to pass along the first threaded portion 26a of the coupling body 16 and to be adjacent or juxtaposed to the coupling mating surface 54a. In other words, an inner diameter of the inner mating section 22a is larger than an inner diameter defined by the first threaded coupling section 24a to facilitate the threaded coupling between the first housing 12a and the coupling body 16, as described herein. The same holds true for the inner mating section 22b of the coupling body 16, and the second threaded coupling portion 24b of the second housing 12b. Indeed, the second housing 12b can be situated over the coupling body 16, such that the inner mating section 22b surrounds and slides over the second threaded portion 26b of the coupling body 16 until the threads of the second threaded coupling section 24b are aligned with the threads of the second threaded portion 26b of the coupling body 16 and the inner mating section 22b is adjacent or juxtaposed to the coupling mating surface 54b. The coupling body 16 may be slightly rotated to initially engage said threads to each other. The coupling body 16 may be slightly rotated (e.g., by operating a tool to rotate the floating torque ring 18) to initially engage the respective threads to each other.

Once the first housing 12a is initially threadably engaged to one end the coupling body 16, and once the second housing 12b is initially threadably engaged to the other end of the coupling body 16 (which can happen concurrently), the floating torque ring 18 can be rotated (e.g., clockwise; see FIG. 2) to cause concurrent, relative rotation of the coupling body 16. This concurrent rotation of the coupling body 16 is made possible with the perimeter protrusions 32 on the coupling body 16 received within and engaged with the inner recesses 36 of the floating torque ring 18. In this configuration, the floating torque ring 18 is prevented from rotating relative to the coupling body 16. In other words, any torque applied to the floating torque ring 18 is transferred to the coupling body 16 via the perimeter protrusions 32 on the coupling body 16 as these are engaged with the inner recesses 36 of the floating torque ring 18. Thus, any rotation of the floating torque ring 18 results in rotation of the coupling body 16. Continued rotation of the floating torque ring 18 and consequently the coupling body 16 causes the first and second housings 12a and 12b to be drawn toward each other, due to the threads of the first threaded coupling section 24a (being left-handed) threadably engaging with the threads of the first threaded portion 26a (being left-handed), and similarly, due to the threads of the second threaded coupling section 24b (being right-handed) threadably engaging with the threads of the second threaded portion 26b (being right-handed). Those skilled in the art will recognize that the left-handed and right-handed thread configurations can be reversed on respective threaded sections, while still achieving the threaded joint between the housings 12a and 12b about the coupling body 16 (a counter-clockwise rotation of the floating torque ring 18 would then be required to join the housings 12a and 12b).

Due to tolerance variations that typically exist between the various machined or fabricated components and due to other factors, such as thread pitch and width variations, the pair of bodies or housings being threadably together may not always be precisely aligned (axially) relative to each other. This means that one housing may not be axially aligned appropriately relative to an adjoining housing and along a central axis of the housings. The result is that fastener holes at ends of each housing (used for fastening the housings together) may not exactly line-up appropriately to receive fasteners to join the housing together. Thus, the housings are not axially aligned relative to each other because of tolerance variations during manufacture of the housings. For instance, one housing may be one millimeter (or more) axially offset (e.g., to the left) along the central axis and away from an adjoining housing. With strict assembly and tolerance requirements of high-precision assemblies, such as with missiles, this axial misalignment of joined housings can be highly problematic to effective operation of the assembly. However, in the present example, such possible variations are inconsequential or negligible to a degree, because the floating torque ring 18 somewhat self-adjusts or auto-aligns the housings 12a and 12b together as they are threadably joined. More specifically and as best shown in FIG. 3B, while rotating the floating torque ring 18, a first planar end surface 40a of the first housing 12a may make "first contact" with a first planar side surface 42a of the floating torque ring 18 before a second planar end surface 40b of the second housing 12b makes contact with a second planar side surface 42b of the floating torque ring 18. Thus, a slight gap G may exist between the floating torque ring 18 and the second housing 12b, as illustrated in FIGS. 3A and 3B. However, because the floating torque ring 18 is axially movable relative to the coupling body 16 along the longitudinal axis X of the component assembly 10, the floating torque ring 18 and the first housing 12a may collectively continue to axially move to the right (see arrow A) along the longitudinal axis X as the floating torque ring 18 and the coupling body 16 are continually rotated in the same direction. This is because the first housing 12a would be biasing the floating torque ring 18 to the right due to the advancing of the first housing 12a while continually being threadably engaged to the coupling body 16. Thus, the floating torque ring 18 and the first housing 12a will continue to axially move to the right (in this example) as the second housing 12b continues to be threadably drawn toward the floating torque ring 18 to the left (arrow B) due to being threadably moved by rotation of the coupling body 16, until such time that the second planar end surface 40b of the second housing 12b makes contact with the second planar side surface 42b of the floating torque ring 18. Once the floating torque ring 18 is abutted against both the first and second housings 12a and 12b (FIG. 1A), the component assembly 10 has fully joined the first and second housings 12a and 12b together independent of their respective axial positions relative to each other.

Note that the floating torque ring 18 stops or restricts movement of the first and second housings 12a and 12b when being drawn toward each other and in the fully assembled or joined state or configuration. This is because distal ends of the threaded coupling sections 24a and 24b (of respective first and second housings 12a and 12b) are allowed to freely threadably engage the coupling body 16 along the axial directions as the first and second housings 12a and 12b are drawn toward each other. In this way, the first and second housings 12a and 12b may freely axially move toward each other without restriction from any feature or stop portion of the coupling body 16 or other features. Thus, regardless of the particular width of the respective threaded coupling sections 24a and 24b, the respective threaded coupling sections 24a and 24b will continued to be threaded to the coupling body 16 until the first and second housings 12a and 12b contact the floating torque ring 18. Said another way, it is only until the time at which the first and second housings 12a and 12b both contact the floating torque ring 18 that the housings 12a and 12b are stopped and restricted from further axial movement, thereby resulting in a tight, precise interface between the first and second housings 12a and 12b as joined by the coupling body 16.

Advantageously, in the example shown, the component assembly 10 generates a substantially consistent outer continuous surface area that can be planar as defined by the plane 44a tangential to the component assembly 10 (as represented by dashed lines extending from such outer continuous surface area of the component assembly 10). This is because the floating torque ring 18 and the first and second housings 12a and 12b have substantially the same outer diameters, and because they are abutted against each other such that the first and second housings 12a and 12b sandwich or directly contact respective sides of the floating torque ring 18. This substantially consistent and continuous outer surface area extends radially around the outer circumference area of the component assembly to generally define a cylindrically-shaped body or device. Stated another way, the surface of the component assembly 10 at any radial location, and as defined by the first and second bodies 12a and 12b and the floating torque ring 18 can be configured to be planar, or to extend about a plane 44a tangential to the component assembly 10. This can be important in applications involving high-trajectory or high velocity vehicles or devices, such as missiles, for a variety of reasons, such as to maximize aerodynamic flight and reduce part count.

As initially discussed above, the inner radial surface area 28 of the coupling body 16 is generally consistent and curvilinear along the entire surface area of the inner radial surface area 28 (because it is formed of one unitary component being the coupling body 16). Thus, the component assembly 10 generates a completely seamless and continuous surface along an inner continuous surface area 44b along the coupling body 16 and proximate the joint interface of the first and second housings 12a and 12b, as illustrated in FIGS. 1A and 1B. Said another way, the inner chamber area 30 defines a solid, cylindrically-shaped void or space because of the fact that the entire surface area of the inner radial surface area 28 of the coupling body 16 has no recesses, protrusions, or other features extending inwardly into the inner chamber area 30.

Because the component assembly 10 is devoid of fasteners (e.g., radial bolts), the outer radial surface area 46 is devoid of recesses or protrusions that may otherwise exist when using such fasteners to join bodies or housings. Thus, the inner radial surface area 28 is devoid or recesses or protrusion that may otherwise exist when using such fasteners to join bodies or housings. This maximizes the available space about the inner chamber area 30 for other components, such as electronic assemblies, propulsion components, cargo, payloads, etc.

The terms "precisely aligned" or "high-precision alignment" can mean that the first and second housings 12a and 12b are axially aligned and joined to each other with any required tolerance, which in some cases can be a near zero tolerance, because of the aforementioned floating torque ring 18 structure and function of accommodating axial alignment of the first and second housings 12a and 12b regardless of their starting (and ending) axial positions relative to each other. In other examples, a relatively small tolerance may exist (due to machining tolerances at the planar end of each housing 12a and 12b, and the planar sides of the floating torque ring 18). In practice, there may be axial and radial dimensional requirements for the various sections being coupled together (i.e., the first and second housings, or additional housings). These dimensional requirements can be translated to the tolerances needed or specified for the radial mating surfaces (e.g., inner mating sections 22a, 22b as mated to the coupling mating surfaces 54a,54b) and the axial mating surfaces (planar end surfaces 40a,40b as mated to the planar side surfaces 42a,42b). Essentially, the component assembly 10 can be toleranced to whatever is required or desired.

Other advantages are noted. For instance, by not using radial fasteners to join the first and second housings, this dramatically reduces part-count of the coupling assembly from potentially dozens of parts (e.g., the several fasteners) present in prior existing designs, to just two parts in the present disclosure, namely, as in this example, just the coupling body 16 and the floating torque ring 18. Moreover, by not including such radial fasteners, the potential for slippage is reduced or eliminated because the axial sheer forces that may exist proximate the coupling assembly 14 are uniformly and radially distributed around the threaded interface between the coupling body 16 and the first and second housings 12*a* and 12*b*. Conversely, with radial fasteners, such axial sheer force would be exerted at each fastener location, whereby each fastener would experience a relatively large sheer force, which makes them prone to slippage and/or failure. This is exacerbated by the fact that such radial fasteners may deform or corrode over time because they are exposed to the environment outside of the coupling assembly, which can also make them prone to slippage and/or failure. In the present disclosure, the substantially seamless, continuous outer surfaces of the torque ring 18 and the first and second housings 12*a* and 12*b* overcome these various disadvantages experienced by prior coupling systems that require fixed radial fasteners.

In one aspect, the component assembly 10 can be configured as an electromagnetic seal to protect at least one electronics assembly 48, supported within the component assembly 10, from electromagnetic (EM) interference (e.g., from the sun, or other source). This is because of the substantially seamless outer surface area discussed above, namely that the outer radial surface area 46 is substantially seamless or gapless along the interface at which the first and second housings 12*a* and 12*b* are joined together. This is also because of the amount of 90 degree turns that any possible EM waves would need to traverse to enter the inner chamber area 30, and therefore possibly interfere with the electronics assembly 48 disposed therein. Specifically, and with reference to FIG. 1B, EM waves would need to traverse between the interface of the floating torque ring 18 and the first housing 12*a*, for instance, and then traverse 90 degrees to the left and through the threaded interface between the first housing 12*a* and the coupling body 16, and then traverse another 90 degrees into the inner chamber area 30. This is a tortuous and seemingly impossible path for EM waves, and therefore the component assembly 10 provides an EM seal to prevent or restrict EM waves from ingress into the inner chamber area 30 to interrupt operation of devices therein.

In some examples, the component assembly 10 may comprise a pair of elastomeric seals 50*a* and 50*b* each situated between the coupling body 16 and respective first and second housings 12*a* and 12*b*, as shown in FIG. 1B. The seals 50*a* and 50*b* can comprise annular elastomeric sealing elements that are received within respective seal recesses 52*a* and 52*b* of the coupling body 16 (or, alternatively, they can be received in recesses of respective housings 12*a* and 12*b*). The first seal 50*a* can be disposed between the first inner mating section 22*a* (of the first housing 12*a*) and a first coupling body mating surface 54*a* of the coupling body 16. Likewise, the second seal 50*b* can be disposed between the second inner mating section 22*b* (of the second housing 12*a*) and a second coupling mating surface 54*b* of the coupling body 16. Therefore, the seals 50*a* and 50*b* are strategically situated on either side laterally of the interface of the floating torque ring 18 to provide environmental sealing for the component assembly 10 (e.g., to prevent moisture and debris/dust from entering the inner chamber area 30). The inner mating sections 22*a*, 22*b* and the coupling mating surfaces 54*a*, 54*b* can be thought of as radial mating surfaces as these mate together upon joining the first and second housings 12*a*,12*b* with the coupling body 16.

Similarly, as shown only in FIG. 3B, third and fourth seals 51*a* and 51*b* can be situated in respective seal recesses 53*a* and 53*b*, and disposed to the left and right of respective first and second seals 50*a* and 50*b*. The third and fourth seals 51*a* and 51*b* can be EMI seals or gaskets operable to reduce or prevent EMI waves from entering the inner chamber area 30. Note that the position of seals 50*a* and 50*b*, and the position of seals 51*a* and 51*b*, can be swapped as desired. Thus, in this example, the four seals provide environmental sealing and EMI sealing to protect valuable components housed in the inner chamber area 30.

FIG. 4 illustrates an example high velocity vehicle in the form of a missile 100 comprising at least one component assembly 110*a* and 110*b*, such as described regarding the component assembly 10 of FIGS. 1A-3B. Accordingly, the missile 100 can comprise a first cylindrical missile section 112*a* joined to a second cylindrical missile section 112*b* by a first component assembly 110*a*, and a third cylindrical missile section 112*c* can be joined to the second cylindrical missile section 112*b* by a second component assembly 110*b* (the component assembly 110*a*, for instance, can comprise a coupling body 116 and a floating torque ring 118). Therefore, as exemplified in FIG. 1A, an inner surface area 111 proximate the first component assembly 110*a* is generally continuous in an axial direction axially along the first component assembly 110*a*. This is because the coupling body 116 of the first component assembly 110*a* has an inner radial surface area 128 that is continuous and consistent, and generally smooth or curvilinear along the entire surface area of the inner radial surface area 128. As also exemplified in FIG. 1A, an outer radial surface area 146 of the missile 100 is generally continuous along an axial direction proximate the first (and second) component assembly 110*a*, as also represented by the plane 144 shown in dashed lines in FIG. 4. Therefore, the first and second component assemblies 110*a* and 110*b* are devoid of fasteners, such as radial bolts, screws, and the like. This generates a generally smooth, continuous and substantially seamless exterior surface of missile 100 along the coupling interfaces of the various joined housings of the missile 100.

The missile 100 can comprise one or more of such component assemblies, and such component assemblies facilitate precise alignment between the missile housing sections because of the aforementioned floating torque ring (e.g., 18, 118) being axially movable relative to the coupling body (e.g., 16, 116) to join the housings (e.g., 12*a* and 12*b*, or 112*a* and 112*b*) regardless of, or independent of, the axial positions of the housing with respect to each other. Thus, the housings of the missile will be axially aligned to each other when fully joined, regardless of the starting position of a particular housing relative to the other housing upon rotating the torque ring and the coupling body to draw together the respective housings, as is further detailed above.

As indicated above, the technology discussed herein is intended to be implemented in a variety of applications.

The housings and coupling assemblies discussed herein can be comprised of a metallic materials (e.g., aluminum, steel), composites, plastics, and/or polymer, etc., or combinations thereof. The threads discussed herein can be formed as any suitable thread geometry, such as high-precision threads machined for missile technology and other high-performance devices.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A component assembly, comprising:
   a first housing comprising a first raised portion that extends inward toward a center of the first housing, the first raised portion comprising a threaded coupling section and an inner mating section;
   a second housing comprising a second raised portion that extends inward toward a center of the second housing, the second raised portion comprising a threaded coupling section and an inner mating section; and
   a coupling assembly joining the first housing to the second housing, the coupling assembly comprising:
      a coupling body comprising a first threaded portion engaged with the threaded coupling section of the first housing, and a second threaded portion engaged with the threaded coupling section of the second housing; and
      a floating torque ring axially slidable relative to and engageable with the coupling body,
   wherein rotation of the floating torque ring causes rotation of the coupling body, and drawing of the first and second housings together to press against the floating torque ring, thereby joining the first housing and the second housing about the coupling body independent of an axial position of the first housing relative to an axial position of the second housing.

2. The component assembly of claim 1, wherein the coupling body comprises a plurality of perimeter protrusions, and wherein the floating torque ring comprises a plurality of inner recesses operable to interface with and engage the plurality of perimeter protrusions, respectively, such that the floating torque ring is radially fixed to the coupling body.

3. The component assembly of claim 2, wherein the plurality of perimeter protrusions are formed radially around an outer perimeter portion of the coupling body, and wherein the plurality of inner recesses are formed radially around an inner portion of the floating torque ring at corresponding positions relative to respective perimeter protrusions.

4. The component assembly of claim 1, further comprising an electromagnetic seal formed by the joining of the first and second housings, the electromagnetic seal configured to protect at least one electronics assembly supported within the component assembly.

5. The component assembly of claim 1, further comprising at least first and second elastomeric seals, each situated between the coupling body and respective first and second housings.

6. The component assembly of claim 1, wherein an outer circumferential surface area defined along the first and second housings and the floating torque ring is generally curvilinear.

7. The component assembly of claim 1, wherein the first threaded coupling section is threaded in an opposite direction relative to the threads of the second threaded coupling section.

8. The component assembly of claim 1, wherein the first threaded coupling section comprises threads formed about an inner area of the first housing, and the second threaded coupling section comprises threads formed about an inner area of the second housing, and wherein the first and second threaded portions of the coupling body each comprise threads formed about an outer area of the coupling body.

9. The component assembly of claim 1, wherein the floating torque ring is situated axially between the first and second threaded portions of the coupling body, and is situated axially between respective ends of the first and second housings.

10. The component assembly of claim 1, wherein the coupling body comprises an inner cylindrically-shaped surface having a generally curvilinear surface along an entire surface area of the inner cylindrically-shaped surface.

11. The component assembly of claim 1, wherein the component assembly is devoid of fasteners protruding inwardly into an inner chamber area defined by the coupling body.

12. A missile comprising at one component assembly of claim 1, wherein the first housing comprises a generally cylindrically-shaped missile housing section, and the second housing comprises a generally cylindrically-shaped missile housing section.

13. The missile of claim 12, wherein an inner surface area proximate the at least one component assembly is generally continuous along the at least one component assembly.

14. The missile of claim 12, wherein an outer surface area proximate the at least one component assembly is generally continuous along the at least one component assembly.

15. A method of coupling housings with a coupling assembly, comprising:
   obtaining a first housing comprising a first raised portion that extends inward toward a center of the first housing, the first raised portion having a first threaded coupling section and an inner mating section, and a second housing comprising a second raised portion that extends inward toward a center of the second housing, the second raised portion having a second threaded coupling section and an inner mating section;
   engaging the first threaded coupling section to a first threaded portion of a coupling body, and engaging the second threaded coupling section to a second threaded portion of the coupling body;
   securing a floating torque ring to the coupling body, situated between the first and second housings; and
   rotating the floating torque ring to rotate the coupling body, thereby causing the first housing and the second housing to be drawn together about the coupling body independent of an axial position of the first housing relative to an axial position of the second housing.

16. The method of claim 15, further comprising rotating the floating torque ring a sufficient degree so as to cause the first and second housings to press against the floating torque ring.

17. The method of claim 15, wherein rotating the floating torque ring facilitates axial movement of the floating torque ring relative to the coupling body upon one of the first or second housings engaging the floating torque ring.

18. The method of claim 15, further comprising sealing at least one electronic component, supported within an inner chamber area defined by the first and second housings, from electromagnetic interference upon joining the first and second housings.

19. The method of claim 15, wherein rotating the floating torque ring comprises rotating a tool engaged to a perimeter portion of the floating torque ring.

20. The method of claim 15, wherein the floating torque ring is axially movable relative to the coupling body upon one of the first or second housings engaging the floating torque ring.

* * * * *